March 31, 1925.  J. P. JACKSON  1,531,340
PLOW
Filed April 14, 1924
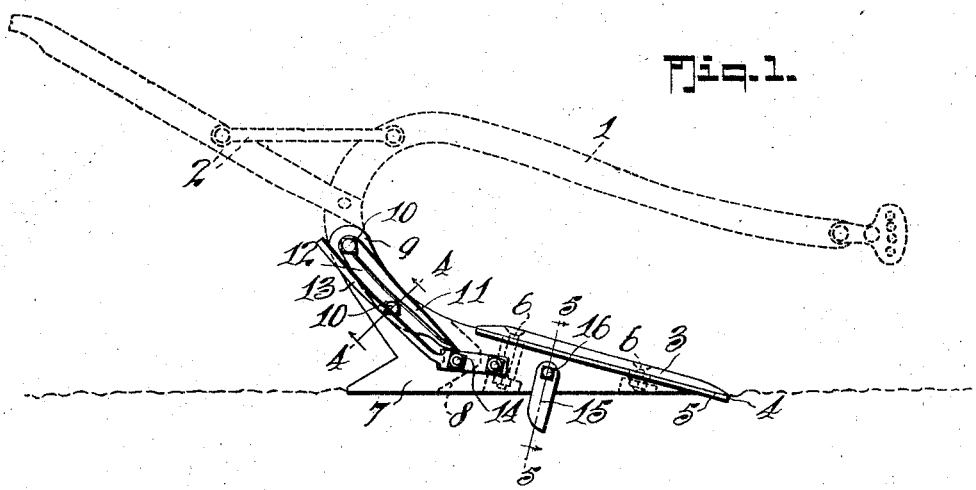
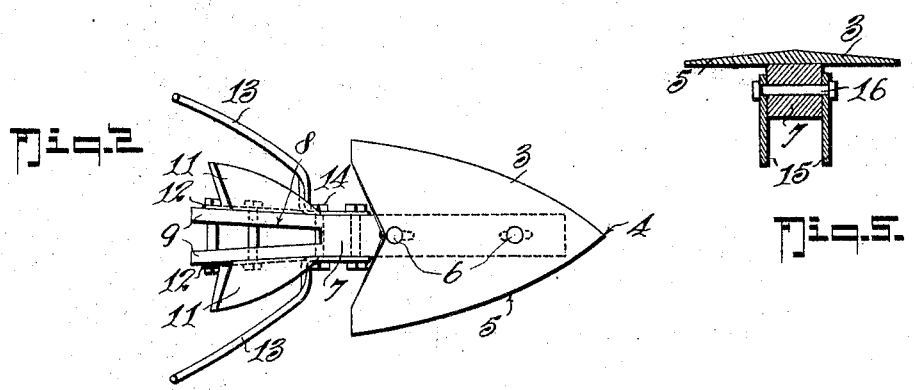
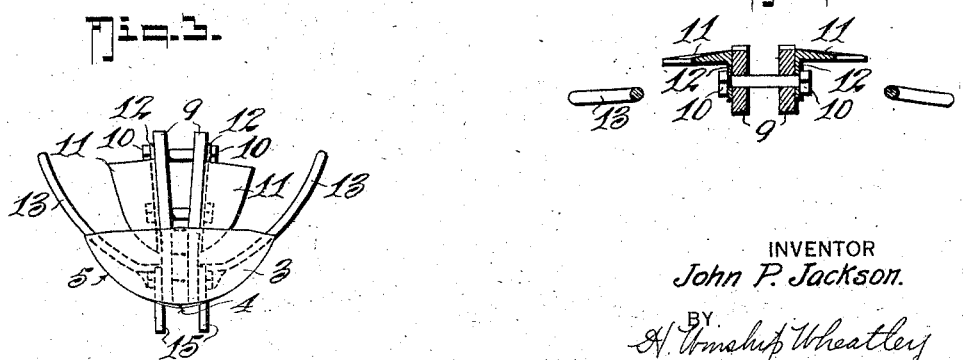
INVENTOR
John P. Jackson.
BY
H. Township Wheatley
ATTORNEY Patented Mar. 31, 1925.

1,531,340

UNITED STATES PATENT OFFICE.

JOHN P. JACKSON, OF GRAFTON, NORTH DAKOTA.

PLOW.

Application filed April 14, 1924. Serial No. 706,527.

*To all whom it may concern:*

Be it known that I, JOHN P. JACKSON, a citizen of the United States, residing at Grafton, in the county of Walsh and State of North Dakota, have invented certain new and useful Improvements in Plows, of which the following is a specification.

The invention relates to plows and more particularly to that class of such agricultural implements as are adaptable to use for weed cutting.

The invention generally has for its object to provide a simple structure of weeder plow, inexpensive to manufacture, and which is so constructed as to be effectively operable to cut and rout out the weeds by the roots and to shake the soil therefrom and leave them upon the surface to be readily removed and burned, or otherwise destroyed.

The invention further seeks to provide a weeder plow of the type stated, which is of a structure embodying means for cutting the sub-soil without turning the same over, thereby to leave it open for the ready reception of moisture necessary to the proper support of the roots of the seed when planted.

With the above and other objects in view that will hereinafter appear, the invention further resides in those novel details of construction, combination and arrangement of parts, all of which will be first fully described, particularly pointed out in the appended claims, reference being had to the accompanying drawing, in which:—

Figure 1 is a side elevation of the invention applied for use.

Figure 2 is a plan view of the invention.

Figure 3 is a front elevation.

Figure 4 is a detail cross section, taken on the line 4—4 on Figure 1.

Figure 5 is a detail cross section, taken on the line 5—5 on Figure 1.

In the drawings in which like numerals of reference indicate like parts in all of the figures, 1 represents the plow beam which may be of any desired construction and to which the invention is secured as an attachment. The usual handle bar structure is indicated at 2, it being understood that the said handles and beam may be of any conventional type and constitute, of themselves, no part of my present invention.

The invention includes a substantially heart-shaped blade 3 which is pointed, as at 4, to facilitate the entrance thereof into the ground, and tapered from the medial line to provide substantially sharp cutting edges 5. The blade is secured, by suitable bolt and nut connections 6, to the plow head in the manner clearly illustrated in Figure 1 of the drawing.

The plow head 7 is cut out, as as 8, to provide a receiving socket and opposing securing wings 9, the said socket being adapted to receive the plow beam 1 and the said wings providing suitable securing means to which the said plow beam is rigidly secured through the medium of the bolt and nut connections 10 which pass therethrough and through the said wings, see Figures 1 and 2 of the drawings.

A supplemental wing 11 is secured to project laterally from each of the securing wings 9, each of said supplemental wings including a securing flange 12 through which the securing bolts 10, hereinbefore referred to, are adapted to pass.

It will be observed that by reason of the shape of the forward portion of the plow head 7 and the means of securing the blade 3, the said blade is held in angled relation to the ground to facilitate penetration thereof and also to provide an upward scraping action very effective in routing out weeds. It will also be observed that the supplemental wings 11 are also mounted to project laterally from the securing wings 9 and at an angle with relation to the ground so that as the earth is cast up by the blade 3, and engages the said supplemental wings 11, they will act to divert or direct laterally the weed bearing earth in a manner for forcibly directing the same against the cooperating soil breaker horns 13, one of which is secured, as at 14, to each side of the plow head so as to project in angled relation rearwardly and upwardly and in position for receiving the said deflected earth and effectively breaking up and distributing the same.

It will also be observed that the wings 11 are so shaped and mounted as to leave a space between the same and the blade 3. The provision of this space permits the loose, weed-free earth to fall freely through, thus relieving the functions of the wings 11 and the horns 13 and aiding the efficiency of the plow as a whole, see Figure 2. It will also be observed from this figure of the drawing that the heart shape feature of the blade 3 is further characterized in the provision of the V notch at the rear thereof. This notch greatly augments the spaced relation of the blade above referred to, the wings formed by the notch efficiently serving to direct the weed bearing earth.

A pair of side knives 15 are secured, as at 16, one at each side of, and projecting downwardly from, the plow head 7, beneath the blade 3. The knives 15 are secured to project downwardly from the said plow head at an angle so as to provide an angled cutting edge to the sub-soil for the purpose of cutting the same, and it will be observed that the knives are in the nature of thin flat blades so that the cutting action will take place without any over-turning or diverting of the sub-soil.

By reason of shaping and positioning the blade 3 as shown and described, the said blade will readily penetrate the ground and effect a cutting and an upwardly pulling action of the weeds, and by reason of the provision of the peculiarly shaped and positioned supplemental wings and breaker horn feature the earth will be diverted, effectively broken up, and re-distributed in a substantially pulverized condition.

The plow illustrated in the foregoing description will be found very effective in its action in routing out weeds by the roots and by acting upon the earth to substantially pulverize the same in a manner for leaving the same in a very desirable condition and also for leaving the weeds and grass roots on the top of the soil so that they may be readily removed and burned or otherwise disposed of.

In this structure the knives 15 provide for a cutting of the sub-soil without a turning-over of the same in a manner which provides for the desired opening up of the soil so that it will be readily receptive to the moisture necessary for the proper support of the roots of the seed when planted.

It will also be observed that the invention is of a nature which can be applied as an attachment to most any conventional type of plow and may be used in plowing the same ground as many times in the same year as may be needed and may also be used with similar success on either wet or dry ground, a feature not common in devices of this type.

It will also be observed that the holes for accommodating the securing bolts 6 which hold the blade 3 in the plow head 7 may be elongated to permit longitudinal adjustment of the position of the said blade as may be desired to best suit the same to efficiently function in consideration of the condition of the ground being worked upon.

From the foregoing description, taken in connection with the accompanying drawing, it is thought that the novel details of construction, the manner of operation and the advantages of my invention will be readily apparent to those skilled in the art to which the invention relates.

What I claim is:

1. In a plow of the type stated, a plow head, a weeder blade carried by the plow head to present the edges thereof in angled relation to the ground, the said plow head being cut out to provide securing wings to which the plow beam may be secured, soil breaker horns secured to the plow head to extend rearwardly therefrom in angled relation therewith, and sub-soil cutting knives secured to and depending from the plow head.

2. In a plow of the type stated, a plow head, a weeder blade carried by the plow head in a manner for presenting the edges thereof in angled relation to the ground, the said plow head having a socket providing side wings for receiving and providing a securing means for the plow beam, earth deflecting wings secured to the plow head in position for deflecting the earth outwardly, and soil breaker horns secured to the plow head to extend therefrom in position for receiving the deflecting earth for effecting a breaking up thereof, and sub-soil cutting knives secured to and depending from the plow head.

3. In a plow of the type stated, a plow head, a weeder blade carried by the plow head in a manner for presenting the edges thereof in angled relation to the ground, the said plow head having a socket providing side wings for receiving and providing a securing means for the plow beam, earth deflecting wings, having flanges adapted to be secured to the plow head whereby to position the said wings for effecting a deflection of the earth outwardly, bolt and nut securing means adapted to pass through the said flanges and the side wings for securing the deflecting wings and the plow beam together in rigid relation and soil breaker horns secured to the plow head to extend therefrom in position for receiving the deflected earth for effecting a breaking up thereof, and sub-soil cutting knives secured to and depending from the plow head.

4. In a plow of the type stated, a plow head, a substantially heart-shaped plow blade having a forward point and being tapered from a medial line to provide substantially sharp edges, bolt and nut connections passing through the blade and the plow head to secure the former to the latter in position for presenting the edges thereof in angled relation to the ground, the said plow head including side wings for receiving and forming a securing means for the plow beam, an earth deflecting wing secured to each plow head side to project therefrom in position for deflecting the earth outwardly, the said deflecting wings each having a flange forming a securing means therefor, bolt and nut connections adapted to pass through the plow head wings, the flanges and the plow beam to secure them in rigid relation, a soil breaker horn secured to each side of the plow head to project therefrom in position to receive and effect a breaking-up of the deflected earth, and sub-soil cutting knives secured to and depending from the plow head.

5. In a plow of the type stated, a plow head, a weeder blade carried by the plow head in a manner for presenting the edges thereof in angled relation to the ground, the said plow head having a socket providing side wings for receiving and providing a securing means for the plow beam, earth deflecting wings secured to the plow head in position for deflecting the earth outwardly, soil breaker horns secured to the plow head to extend therefrom in position for receiving the deflected earth for effecting a breaking up thereof, the earth deflecting wings and the weeder blade being cooperatively positioned whereby to leave a space therebetween and the said weeder blade being provided with a cut away notch to augment the said space.

6. In a plow of the type stated, a plow head, a weeder blade carried by the plow head in a manner for presenting the edges thereof in angled relation to the ground, the said plow head having a socket providing side wings for receiving and providing a securing means for the plow beam, earth deflecting wings, having flanges adapted to be secured to the plow head whereby to position the said wings for effecting a deflection of the earth outwardly, bolt and nut securing means adapted to pass through the said flanges and the side wings for securing the deflecting wings and the plow beam together in rigid relation and soil breaker horns secured to the plow head to extend therefrom in position for receiving the deflected earth for effecting a breaking up thereof, sub-soiling cutting knives secured to and depending from the plow head, the earth deflecting wings and the weeder blade being cooperatively positioned whereby to leave a space therebetween and the said weeder blade being provided with a cut away notch to augment the said space.

JOHN P. JACKSON.